(12) United States Patent
Loudamy

(10) Patent No.: US 6,966,543 B2
(45) Date of Patent: Nov. 22, 2005

(54) TIE-DOWN REWIND TOOL

(76) Inventor: Tom Loudamy, 617 W. Hunter St., Hobbs, NM (US) 88240

( * ) Notice: Subject to any disclaimer, the term of this patent is extended or adjusted under 35 U.S.C. 154(b) by 128 days.

(21) Appl. No.: 10/736,463

(22) Filed: Dec. 15, 2003

(65) Prior Publication Data

US 2004/0173707 A1  Sep. 9, 2004

Related U.S. Application Data

(60) Provisional application No. 60/433,358, filed on Dec. 13, 2002.

(51) Int. Cl.[7] ............................................. B21F 9/00
(52) U.S. Cl. ...................... 254/243; 254/223; 74/545
(58) Field of Search ............................... 254/224, 243, 254/262, 323; 410/10, 11, 12, 100, 103; 74/543–546; 24/68 CD, 68 CTC, 69 CD, 273

(56) References Cited

U.S. PATENT DOCUMENTS

| | | | |
|---|---|---|---|
| 681,291 A | * 8/1901 | Angle | ........................ 254/223 |
| 2,464,941 A | * 3/1949 | Rader | ........................... 74/545 |
| 2,543,151 A | * 2/1951 | Cerniak | ....................... 220/212 |
| 4,296,916 A | * 10/1981 | Jewett | ......................... 254/380 |
| 5,433,565 A | * 7/1995 | Chan | ........................... 410/103 |
| 6,230,582 B1 | * 5/2001 | Becker et al. | ................. 74/545 |
| 6,880,810 B1 | * 4/2005 | Hu | .............................. 254/218 |

* cited by examiner

Primary Examiner—Emmanuel M Marcelo
(74) Attorney, Agent, or Firm—Jackson Walker LLP; Robert C. Klinger

(57) ABSTRACT

A tool for association with a ratchet wheel of a tie-down device, the tie-down device for securing an article by a strap whereby a shaft is journaled for rotation in which the strap is wound around the shaft in a take-up direction, the tie-down device including a ratchet wheel having ratchet teeth rotatable with the shaft and further having a center bore which extends in a direction parallel with the shaft. The tool enables a user to quickly rewind the strap on the shaft in the take-up direction for storing the strap when not being used of securing.

20 Claims, 3 Drawing Sheets

TIE-DOWN REWIND TOOL

This application claims the priority under 35 U.S.C. 119(e)(1) of now abandoned U.S. provisional application No. 60/433,358, filed on Dec. 13, 2002.

FIELD OF THE INVENTION

The present invention relates to tensioning apparatus and, more particularly, to an apparatus for providing a rapid wind back of the tension belt or strap.

BACKGROUND OF THE INVENTION

In the past, it has been a simple practice to employ a variety of straps, ropes, bungee cords and the like for holding cargo or other loads in a secure position on a vehicle. At the other end of the spectrum are the ratcheted type tie-down devices often use on tractor trailers which employ ratchet teeth and spring loaded catch mechanisms. Such tensioning apparatuses serve as tensioning and tie-down devices, with lashing straps constituting the preferred embodiment of the tensioning and tie-down means. In ratcheted type tie-down devices, each tie-down strap usually has a hook at one end for securing to the trailer frame in which the other end is coupled with the ratchet tooth and spring loaded catch mechanism for adjusting the length of the strap that is disposed between the two ends.

Referring now to FIGS. 1A and 1B there is illustrated a conventional tie-down device 10. These type devices typically include a U-shaped frame having side walls with a rotatable spindle 15 or winding shaft bridging the space between the side walls and supported via thru-holes. The U-shaped frame also includes an assembly 11 for coupling to the trailer frame. Generally, these device are maintained of the trailer even during times of non-use. In some cases, these devices may be integrated with the trailer and become integral part thereof.

The spindle 15 includes a opening 17, such as a thru-slot, for securing the free end of the strap. At one end of the spindle 15 is a heavy duty flange end which supports coupling with a tightening lever (not shown). More specifically, the flange end includes a plurality of openings located circumferentially in which each can support one end of the lever such that the lever can be inserted and used as a cheater bar to tighten the strap. The other end of the spindle is coupled to a ratchet 19 having inclined teeth into which a pawl 21 (i.e., tooth catch mechanism) drops so that motion can be imparted to the spindle to allow motion in one direction only. The pawl 21 is shown in a released position and would be engaged if pivoted in a direction indicated by the dashed line. Further, ratchets used on conventional tractor trailer tie-downs, such as that shown, have a thru-hole 23 which runs parallel with the length of the spindle 15.

As a user tightens the device via the lever, the pawl 21 clicks as it catches each tooth of the ratchet 19 as the device is tightened. During the unload procedure, the pawl 21 is removed from engagement with the teeth and the take-up spindle 15 spins free under the influence of the forces from the strap allowing the strap to be released or lengthened.

Typical operation includes encircling the load to be secured with the strap, securing the strap hook to a frame portion of the trailer and pulling the free end of the lashing strap through the slot 17 within the spindle 15. Then the spindle 15 is rotated by inserting the lever and pivoting it in the tensioning direction. Typically, the lever is only pivoted a partial turn and is removed and re-inserted in another flange opening for further tensioning. The tensioning lever drives the externally-toothed ratchet wheel 19 in the tensioning direction of the spindle, so that the lashing strap is wound around the spindle which acts in the manner of a wind-up reel and is thus charged with an increasing lashing tension.

Conventionally, with no tension on the strap (i.e., when not in use), the strap is wound by the user grasping the flange end 13 and turning the spindle 15 (as this is quicker than using the lever), with each turn winding only a small portion of the strap length. The manual winding of each tie-down strap takes an individual several minutes each to wind, causing fatigue, and in some instances, contributing to carpal tunnel syndrome due to the repetitious motion associated with winding each strap.

For practical reasons which should be apparent, it is most convenient for the straps to be stored on the spindle 15 and not in some other location when the tie-downs are not in use. However, because of the difficulty, health hazards, and/or time consumed in winding the entire length of the strap onto the spindle 15, truckers remove the straps from the tie-down devices 10 and stored them in some other location (usually in the tractor) and do not wind them onto the spindles 15.

There is a need of a means to increase efficiency and decrease effort and energy in winding tie-down straps when not in use. The improvement efficiency would allow for faster cargo loading and unloading, which in turn, allows for faster and more frequent deliveries of cargo. Further, the decrease in repetitious motion associated with manual winding would reduce the fatigue created by the manual griping and turning of the wind-up reel.

SUMMARY

The present invention achieves technical advantages as a system and apparatus for association with a ratchet wheel of a tie-down device for rapid rewinding of a lashing strap. The tie-down device for securing an article by a strap whereby a shaft is journaled for rotation in which the strap is wound around the shaft in a take-up direction, the tie-down device including a ratchet wheel having ratchet teeth rotatable with the shaft and further having a center bore which extends in a direction parallel with the shaft. The apparatus provides for rapid rewinding of the strap in the take-up direction via cooperable engagement with the ratchet teeth and center bore and rotation thereof.

BRIEF DESCRIPTION OF THE DRAWINGS

For a more complete understanding of the present invention, reference is made to the following detailed description taken in conjunction with the accompanying drawings wherein.

DETAILED DESCRIPTION

Figure 1A:
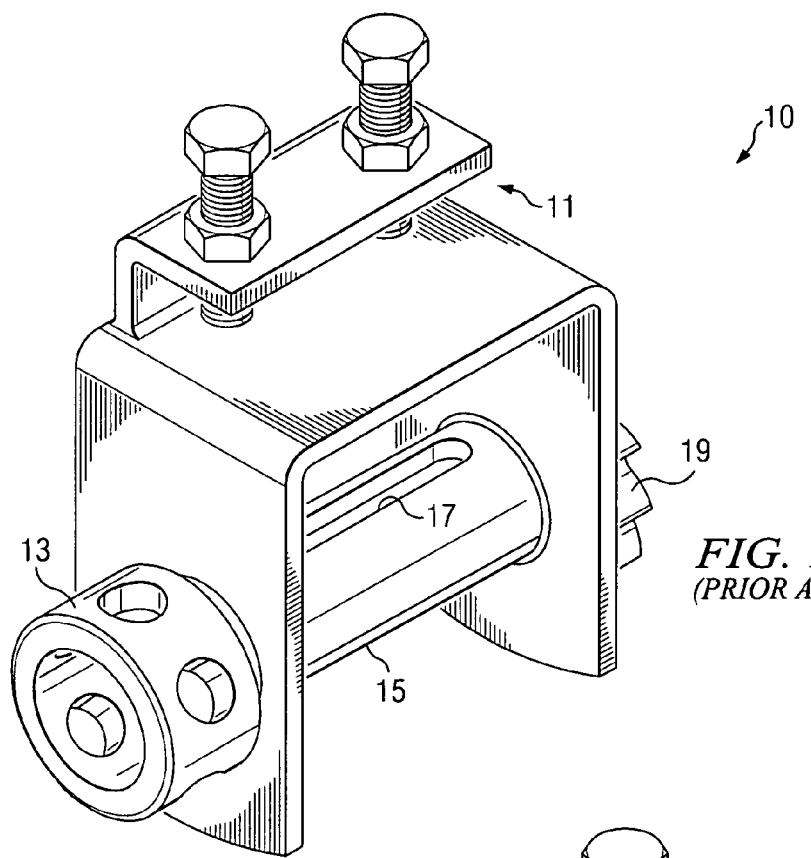
FIGS. 1A and 1B illustrate a prior art a tie-down device used on many tractor trailer rigs.

The numerous innovative teachings of the present tensioning apparatus will be described with particular reference to the presently preferred exemplary embodiments. However, it should be understood that this class of embodiments provides only a few examples of advantageous uses and innovative teachings herein. In general, statements made in the specification of the present application do not necessarily delimit any of the various claimed inventions. Moreover, some statements may apply to some inventive features, but not to others. Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

The present invention enables the tie-down strap to remain intact on the spindle of the tie-down device 10 along the side of a trailer or cargo bed when not in use. Because the strap remains on its own spindle, it is less susceptible to loss or misplacement and/or the operator has the convenience of not having to re-attach since the strap is already in place for the next use.

Figure 3A:
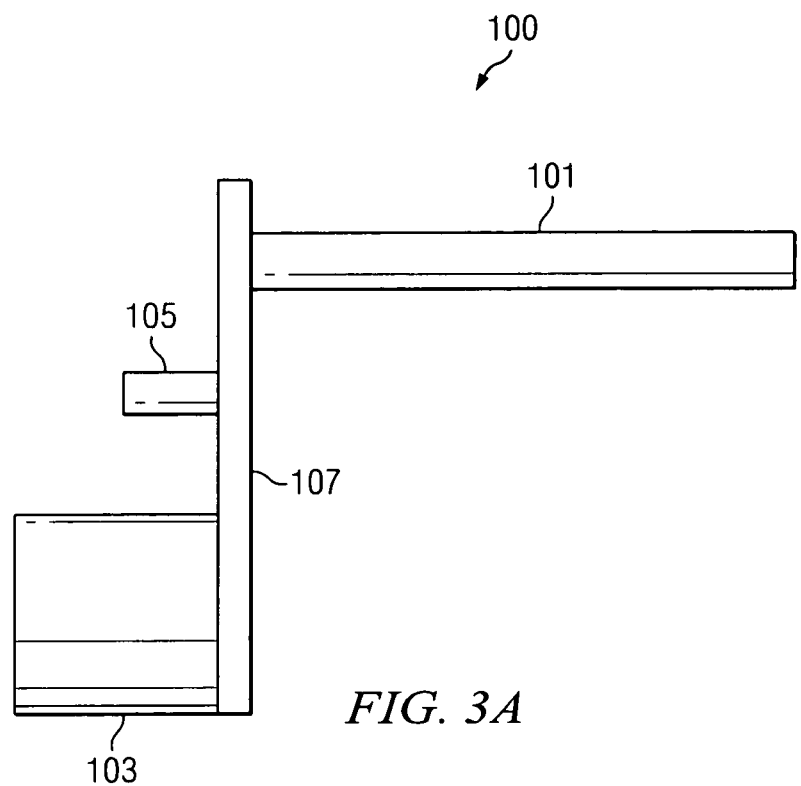
FIGS. 3A and 3B shows a side view and a front view of the rewind tool in accordance with exemplary embodiments of the present invention.
Figure 3B:
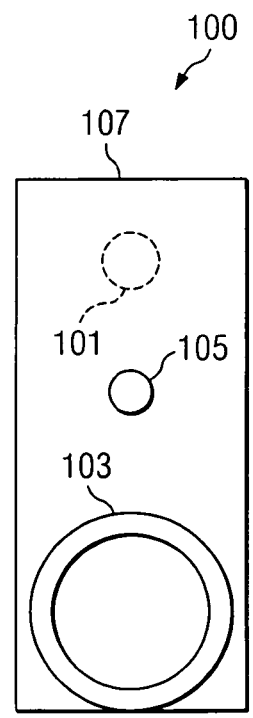

Referring to FIGS. 3A and 3B there are shown a side view and a front view of a rewind tool in accordance with exemplary embodiments of the present invention. The rewind tool 100 includes a main handle portion attached three extensions 101, 103, 105. A bore extension 103 is coupled to one end of the handle portion 107 on a front surface and extends substantially perpendicularly from this first surface. The bore extension 103 is adapted for insertion into the ratchet center bore 23 and is shown as a cylindrical shaped tube, however, the bore extension 103 can be any number of shapes which have an operative overall diameter which enables the bore extension 103 to be engage with the ratchet wheel bore 23 and fit snuggly therein. In a preferred embodiment which enables engagement with most currently used trailer tie-down devices, the bore extension 103 is cylindrical having a diameter of approximately one and three tenths of an inch.

A second extension or the ratchet tooth extension 105 is coupled to the main handle portion 107 front surface and also extends substantially perpendicularly therefrom. The tooth extension 105 is adapted for insertion into the ratchet teeth and is shown having a cylindrical shape, however, the tooth extension 105 can be any number of shapes which enables the tooth extension 105 engagement down toward the valley portion of two adjacent teeth. In a preferred embodiment which enables engagement with most currently used trailer tie-down devices, the tooth extension 105 is a cylindrical bar having a diameter of approximately two tenths of an inch. Since the bore extension 103 and the tooth extension 105 must be cooperable for engagement with the ratchet wheel 19, they must be separated on the handle portion by a predetermined distance. For engagement with most currently used trailer tie-down devices, that separation distance should be approximately seven tenths of an inch.

A third extension or the handle grip 101 is coupled to the handle portion 107 opposite the end having the bore extension 103 and on the back side of the handle portion 107 and extending substantially perpendicularly therefrom. The handle grip 101 is for gripping with a hand for rotating the ratchet wheel 19 and shaft 15 when the bore 103 and tooth 105 extensions are engaged, via rotation. Referring now to FIGS. 2A and 2B there is illustrated the rewind tool 100 in accordance with exemplary embodiments of the present invention shown cooperable with the prior art tie-down device 10 illustrated in FIGS. 1A and 1B.

Figure 1B:
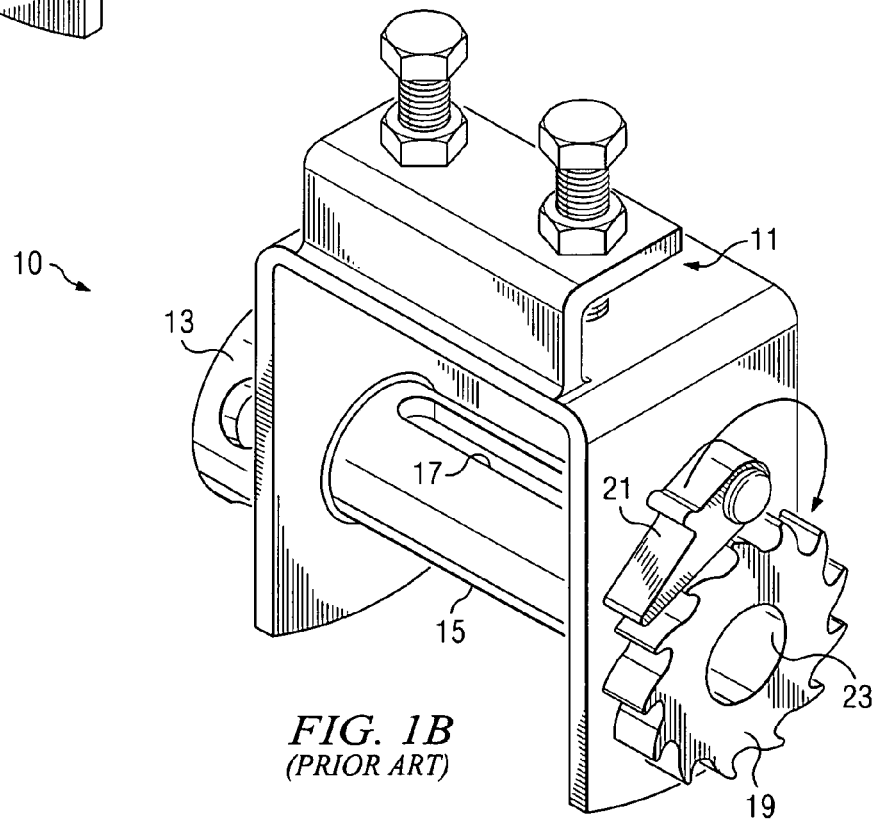
Figure 2A:
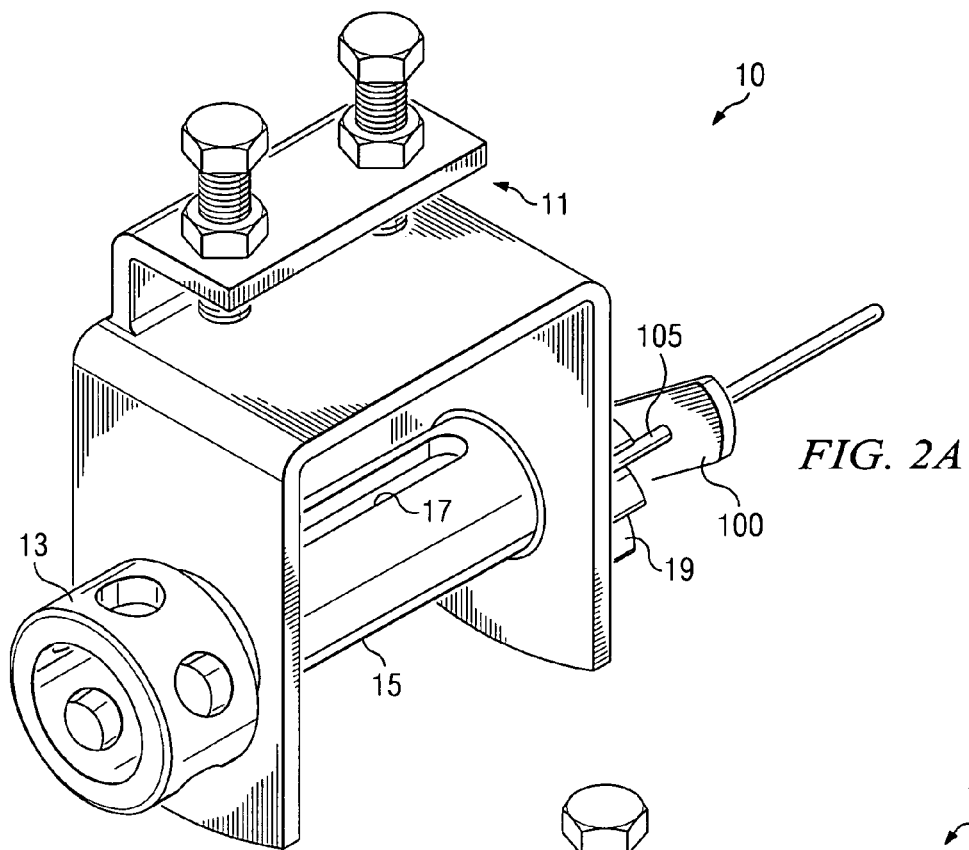
FIGS. 2A and 2B illustrate a rewind tool in accordance with exemplary embodiments of the present invention shown cooperable with the prior art a tie-down device illustrated in FIGS. 1A and 1B.
Figure 2B:
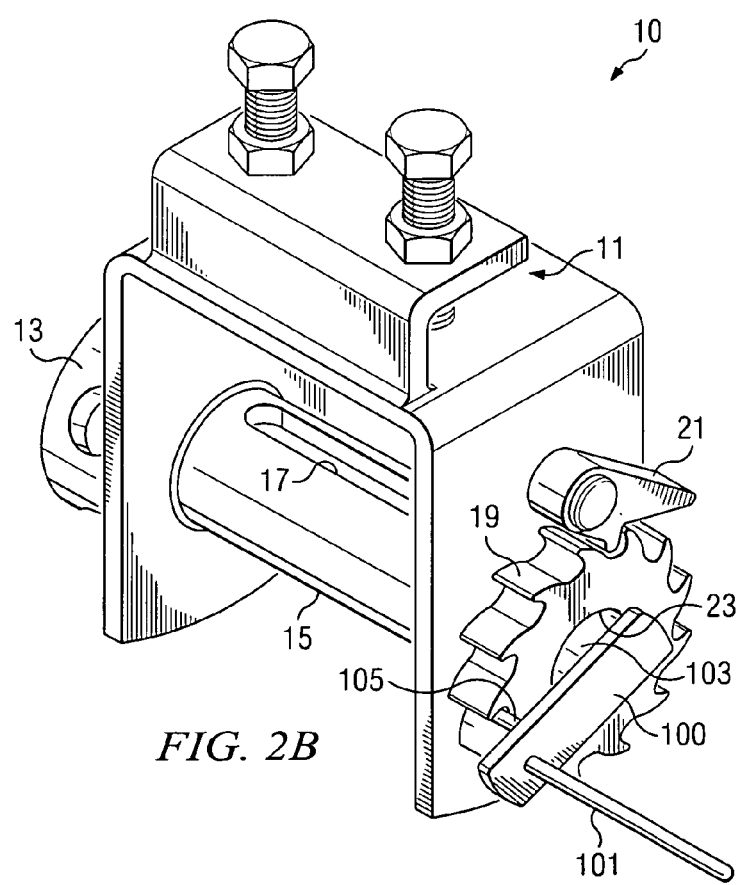

Using the tie-down device 10 illustrated in FIGS. 1A and 1B, the time required to manually wind a 27 foot tie-down strap can easily take three or more minutes, and require over 100 manual hand turns to wind. The time required to wind the same 27 foot tie-down strap using the device shown in FIGS. 2A, 2B, 3A, and 3B has been experimentally determined to be as little as approximately 27 seconds, and only requiring approximately 27 rotations (on average winding approximately one foot of strap per rotation at one second per rotation).

Although exemplary embodiments of the invention are described above in detail, this does not limit the scope of the invention, which can be practiced in a variety of embodiments.

What is claimed is:

1. A tool for association with a ratchet wheel of a tie-down device, the tie-down device for securing an article by a strap whereby a shaft is journaled for rotation in which the strap is wound around the shaft in a take-up direction, the tie-down device ratchet wheel having ratchet teeth rotatable with the shaft and a pawl engaging the ratchet teeth to allow rotation of the winding shaft in the take-up direction and prevent rotation in the other direction, the ratchet wheel further having a center bore which extends in a direction parallel with the shaft, the tool comprising:
   a handle having substantially parallel first and second surfaces;
   a first extension coupled to a distal end of said handle on said first surface and extending perpendicularly therefrom and adapted for insertion into the ratchet center bore;
   a second extension coupled to a center portion of said handle first surface and extending perpendicularly therefrom and adapted for insertion into the ratchet teeth; and
   a third extension coupled to said handle opposite said distal end on said second surface and extending perpendicularly therefrom.

2. The tool of claim 1, wherein said third extension is cooperable with said first and second extensions for enabling a user to rotate the tie-down device shaft when said first extension and said second extension are engaged with said ratchet center bore and ratchet teeth, respectively.

3. The tool of claim 1, wherein said first extension has an effective diameter of slightly less than the ratchet wheel center bore.

4. The tool of claim 1, wherein said first extension has an effective diameter of slightly less than the ratchet wheel center bore such that said first extension is insertable thereinto for snug fit therein.

5. The tool of claim 1, wherein said first extension has a cylindrical shape extending perpendicularly from said handle first surface and has a diameter slightly less than the ratchet wheel center bore such that said first extension is insertable thereinto for snug fit therein.

6. The tool of claim 1, wherein said first extension has a cylindrical shape extending perpendicularly from said handle first surface and has a diameter of approximately 1.3 inches.

7. The tool of claim 1, wherein said second extension is located on said handle first surface at a cooperable distance from said first extension such that said first extension is insertable into said ratchet center bore and said second extension is insertable into the ratchet teeth.

8. The tool of claim 1, wherein said second extension is located on said handle first surface at a distance from said first extension which is approximately equal to the distance from the valley of a ratchet wheel tooth to the outside circumference of the ratchet wheel center bore.

9. The tool of claim 1, wherein said second extension is located on said handle first surface at a distance from said first extension which is approximately equal to seven tenths of an inch.

10. The tool of claim 1, wherein said third extension extends from said handle second surface at a distant enabling the grasp of a human hand.

11. A lashing system, comprising:
a tie-down assembly for securing an article via a strap, said tie-down assembly having a frame and a shaft is journaled thereto for rotation in which said strap is windable around said shaft in a take-up direction via a pivoting lever selectively engagable with and rotatable with said shaft for incremental pivoting, said tie-down device further having a ratchet wheel having ratchet teeth rotatable with the shaft, the ratchet wheel further having a center bore which extends in a direction parallel with the shaft; and
a rewind tool comprising:
   a handle having substantially parallel first and second surfaces;
   a first extension coupled to a distal end of said handle on said first surface and extending perpendicularly therefrom and adapted for insertion into the ratchet center bore;
   a second extension coupled to a center portion of said handle first surface and extending perpendicularly therefrom and adapted for insertion into the ratchet teeth; and
   a third extension coupled to said handle opposite said distal end on said second surface and extending perpendicularly therefrom.

12. The lashing system of claim 11, wherein said third extension is cooperable with said first and second extensions for enabling a user to rotate the tie-down device shaft when said first extension and said second extension are engaged with said ratchet center bore and ratchet teeth, respectively.

13. The lashing system of claim 11, wherein said first extension has an effective diameter of slightly less than the ratchet wheel center bore.

14. The lashing system of claim 11, wherein said first extension has an effective diameter of slightly less than the ratchet wheel center bore such that said first extension is insertable thereinto for snug fit therein.

15. The lashing system of claim 11, wherein said first extension has a cylindrical shape extending perpendicularly from said handle first surface and has a diameter slightly less than the ratchet wheel center bore such that said first extension is insertable thereinto for snug fit therein.

16. The lashing system of claim 11, wherein said first extension has a cylindrical shape extending perpendicularly from said handle first surface and has a diameter of approximately 1.3 inches.

17. The lashing system of claim 11, wherein said second extension is located on said handle first surface at a cooperable distance from said first extension such that said first extension is insertable into said ratchet center bore and said second extension is insertable into the ratchet teeth.

18. The lashing system of claim 11, wherein said second extension is located on said handle first surface at a distance from said first extension which is approximately equal to the distance from the valley of a ratchet wheel tooth to the outside circumference of the ratchet wheel center bore.

19. The lashing system of claim 11, wherein said second extension is located on said handle first surface at a distance from said first extension which is approximately equal to seven tenths of an inch.

20. The lashing system of claim 11, wherein said third extension extends from said handle second surface at a distant enabling the grasp of a human hand.

* * * * *